United States Patent
Xu et al.

(10) Patent No.: US 10,718,669 B2
(45) Date of Patent: Jul. 21, 2020

(54) RE-CALIBRATING COLOR MEASUREMENT INSTRUMENTS BASED ON USER-MADE COLOR SELECTIONS

(71) Applicant: Datacolor, Inc., Lawrenceville, NJ (US)

(72) Inventors: Zhiling Xu, West Windsor, NJ (US); Taeyoung Park, Princeton Junction, NJ (US)

(73) Assignee: DATACOLOR, INC., Lawrenceville, NJ (US)

(*) Notice: Subject to any disclaimer, the term of this patent is extended or adjusted under 35 U.S.C. 154(b) by 121 days.

(21) Appl. No.: 16/129,283

(22) Filed: Sep. 12, 2018

(65) Prior Publication Data

US 2020/0080893 A1   Mar. 12, 2020

(51) Int. Cl.
*G01J 3/52* (2006.01)
*G06F 8/65* (2018.01)
*G06N 3/08* (2006.01)
*G06N 7/00* (2006.01)

(52) U.S. Cl.
CPC ............ *G01J 3/524* (2013.01); *G06F 8/65* (2013.01); *G06N 3/08* (2013.01); *G06N 7/00* (2013.01)

(58) Field of Classification Search
CPC .. G01J 3/524; G06N 3/08; G06N 7/00; G06F 8/65
See application file for complete search history.

(56) References Cited

U.S. PATENT DOCUMENTS

| | | | |
|---|---|---|---|
| 2005/0068520 A1* | 3/2005 | Beimers | G01J 3/02 356/72 |
| 2010/0043706 A1* | 2/2010 | Jung | A61B 5/0075 118/712 |
| 2017/0131147 A1 | 5/2017 | Yu et al. | |
| 2018/0328841 A1* | 11/2018 | Graham | A61M 16/0672 |
| 2018/0367773 A1* | 12/2018 | Holub | G01J 3/0289 |

* cited by examiner

*Primary Examiner* — Hwa Andrew Lee (57) ABSTRACT

In one example, an initial transform is stored for converting wavelength channel responses of a color measurement instrument to color readings. The initial transform is set in-factory by a manufacturer of the color measurement device. A color selection of a sample is subsequently retrieved from a database, where the color selection was made by an end user in response to a color reading by the color measurement instrument using the initial transform. An adjustment to the initial transform is calculated using the color selection. The adjustment is then sent to the color measurement instrument for use in making future color measurements.

20 Claims, 6 Drawing Sheets

RE-CALIBRATING COLOR MEASUREMENT INSTRUMENTS BASED ON USER-MADE COLOR SELECTIONS

FIELD OF THE DISCLOSURE

The present invention generally relates to the measurement of color, and more specifically relates to the re-calibration of color measurement instruments for measuring the colors of objects.

BACKGROUND

In order to measure the color of an object, a color measurement instrument such as a colorimeter, a spectrophotometer, a spectroradiometer, or the like is typically used. The color measurement instrument may measure some aspect of the object's interaction with light and output corresponding values that correspond to R,G,B color values, XYZ tristimulus values, Commission internationale de l'éclairage (CIE) L*a*b* values, or other color values. Traditionally, the color measurement instrument is calibrated in-factory by the manufacturer before being deployed in the field by an end user.

SUMMARY OF THE DISCLOSURE

In one example, an initial transform is stored for converting wavelength channel responses of a color measurement instrument to color readings. The initial transform is set in-factory by a manufacturer of the color measurement device. A color selection of a sample is subsequently retrieved from a database, where the color selection was made by an end user in response to a color reading by the color measurement instrument using the initial transform. An adjustment to the initial transform is calculated using the color selection. The adjustment is then sent to the color measurement instrument for use in making future color measurements.

In another example, a non-transitory computer-readable medium stores instructions which, when executed by a processor, cause the processor to perform operations. The operations include storing an initial transform for converting wavelength channel responses of a color measurement instrument to color readings, wherein the initial transform is set in-factory by a manufacturer of the color measurement device, retrieving a color selection of a sample from a database, wherein the color selection was made by an end user in response to a color reading by the color measurement instrument using the initial transform, calculating an adjustment to the initial transform using the color selection, and sending the adjustment to the color measurement instrument for use in making future color measurements.

In another example, a color measurement instrument stores an initial transform for converting wavelength channel responses of the color measurement instrument to color readings. The color measurement instrument downloads a firmware update, where the firmware update includes an adjustment to the initial transform, and where the adjustment is based on a first color selection made by an end user in response to a first color reading by the color measurement instrument. The color measurement instrument adjusts the initial transform based on the adjustment to generate a new transform.

BRIEF DESCRIPTION OF THE DRAWINGS

The teachings of the present disclosure can be readily understood by considering the following detailed description in conjunction with the accompanying drawings, in which.

DETAILED DESCRIPTION

In one example, the present invention includes a software program for re-calibrating a color measurement instrument based on user-made (e.g., in-field) color selections. As discussed above, color measurement instruments are typically calibrated in-factory by the manufacturer before being deployed in the field by end users. In use, a color measurement instrument may measure the color of a color sample, search a database for the closest matching standard color(s), and provide the closest matching standard color(s) to the end user, who ultimately selects one of the closest matching color standards as the color for the sample. The accuracy of the color measurement instrument's measurements is determined by the factory calibration and is not typically affected by subsequent use by the end user in the field.

Examples of the present disclosure collect color measurements made in the field by color measurement instruments, as well as corresponding color selections made by the end users, and store these color measurements and color selections in a remote network storage (e.g., "the cloud"). The network storage may store color measurements and color selections made by a large number of end users measuring a large number of different color samples. The manufacturer of a particular color measurement instrument may subsequently access the user-made color selections from the network storage and use these user-made color selections to re-calibrate the color measurement instrument, for instance by calculating a calibration adjustment to a transform employed by the color measurement instrument. This approach allows manufacturers of color measurement instruments to improve the measurement accuracies of their color measurement instruments after the color measurement instruments have left the factory, by calculating calibration adjustments based on feedback (i.e., actual color measurements and corresponding selections made in the field) from end users. These calibration adjustments can then be provided to the end users of the color measurement instruments.

Within the context of the present disclosure, a "color measurement" is understood to refer to a direct measurement of a sample's color by a color measurement instrument. A "user-made color selection" is understood to refer to a selection of a color, made by a human end user of the color measurement instrument, in response to (or based on) the color measurement. Thus, a user-made color selection may be considered as an end user's subjective interpretation of a color measurement made by a color measurement instrument.

Figure 1:
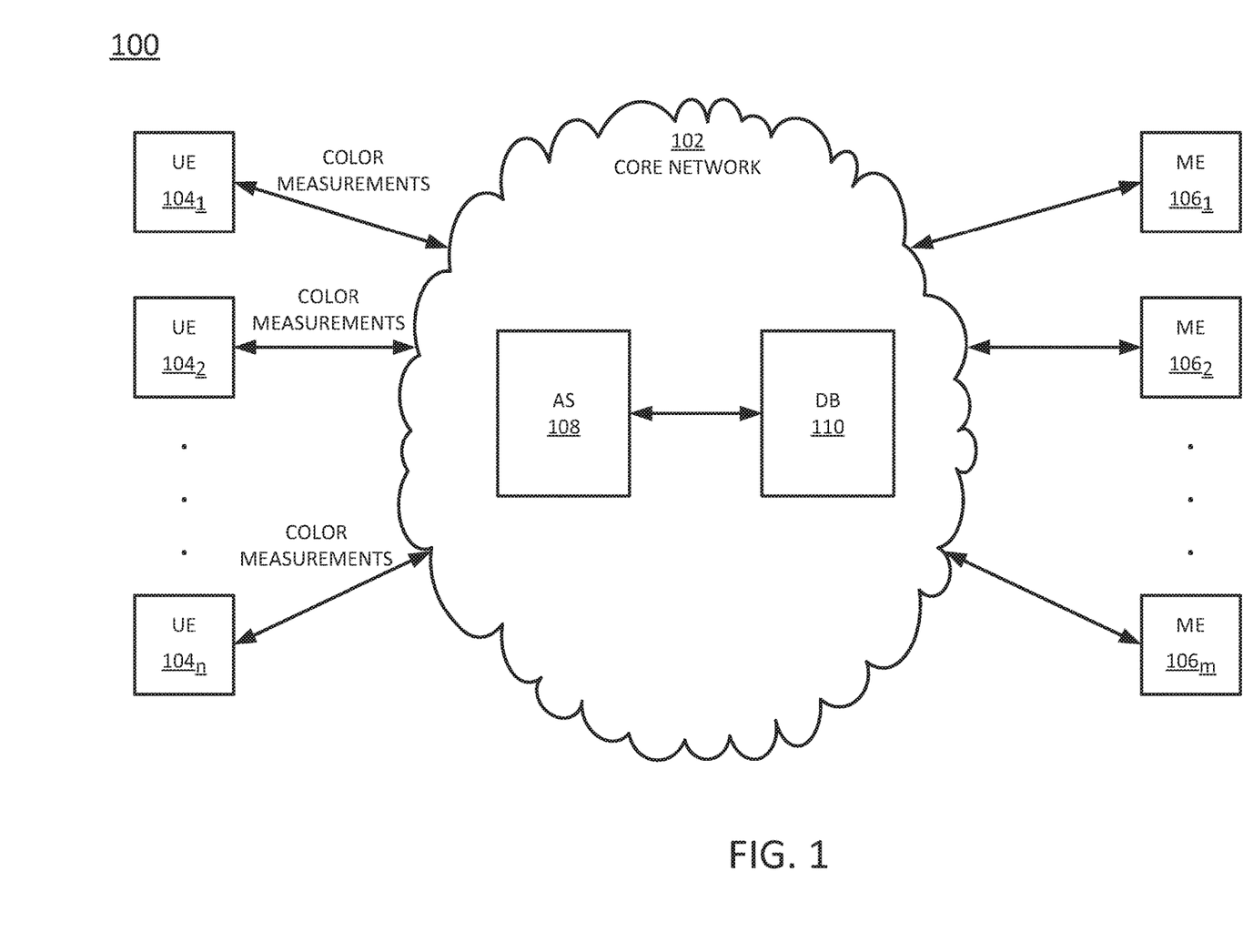
FIG. 1 illustrates an example network related to the present disclosure.

To better understand the present disclosure, FIG. 1 illustrates an example network 100 related to the present disclosure. The network 100 may be any type of communications network, such as for example, an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one example, the network 100 may comprise a core network 102. In one example, the core network 102 may functionally comprise a fixed mobile convergence (FMC) network, e.g., an IP Multimedia Subsystem (IMS) network. The core network 102 may also further comprise an Internet Service Provider (ISP) network. In one example, the core network 102 may include an application server (AS) 108 and a database DB 110. Although a single AS 108 and a single DB 110 are illustrated, it should be noted that any number of application servers and databases may be deployed. Furthermore, for ease of illustration, various additional elements of core network 102 are omitted from FIG. 1, including switches, routers, firewalls, web servers, and the like.

In one example, the core network 102 may be in communication (e.g., via at least one access network, not shown) with one or more user endpoint devices (UEs) $104_1$-$104_n$ (hereinafter individually referred to as a "UE 104 or collectively referred to as "UEs 104"). In one example, the UEs 104 may be any type of user endpoint device configured for wireless communication, such as a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, a set top box, a smart television, and the like. In one example, any one or more of the UEs 104 may have both cellular and non-cellular access capabilities and may further have wired communication and networking capabilities (e.g., such as a desktop computer). Each of the UEs 104 may be in communication with a respective color measurement instrument (not shown), such as a colorimeter, a spectrophotometer, or a spectroradiometer. Alternatively one or more of the UEs 104 may comprise a color measurement instrument that is additionally configured for wireless or wired communication. In one example, all of the UEs 104 are operated by respective end users/customers (e.g., users of color measurement instruments).

In addition, the core network 102 may be in communication with one or more manufacturer endpoint devices (MEs) $106_1$-$106_m$ (hereinafter individually referred to as a "ME 106 or collectively referred to as "MEs 106"). In one example, the MEs 106, like the UEs 104, may be any type of endpoint device configured for wired or wireless communication, such as a laptop computer, a desktop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, a set top box, a smart television, and the like. In one example, any one or more of the MEs 106 may have both cellular and non-cellular access capabilities. In one example, at least some of the MEs 106 are operated by respective manufacturers of color measurement instruments.

Figure 6:
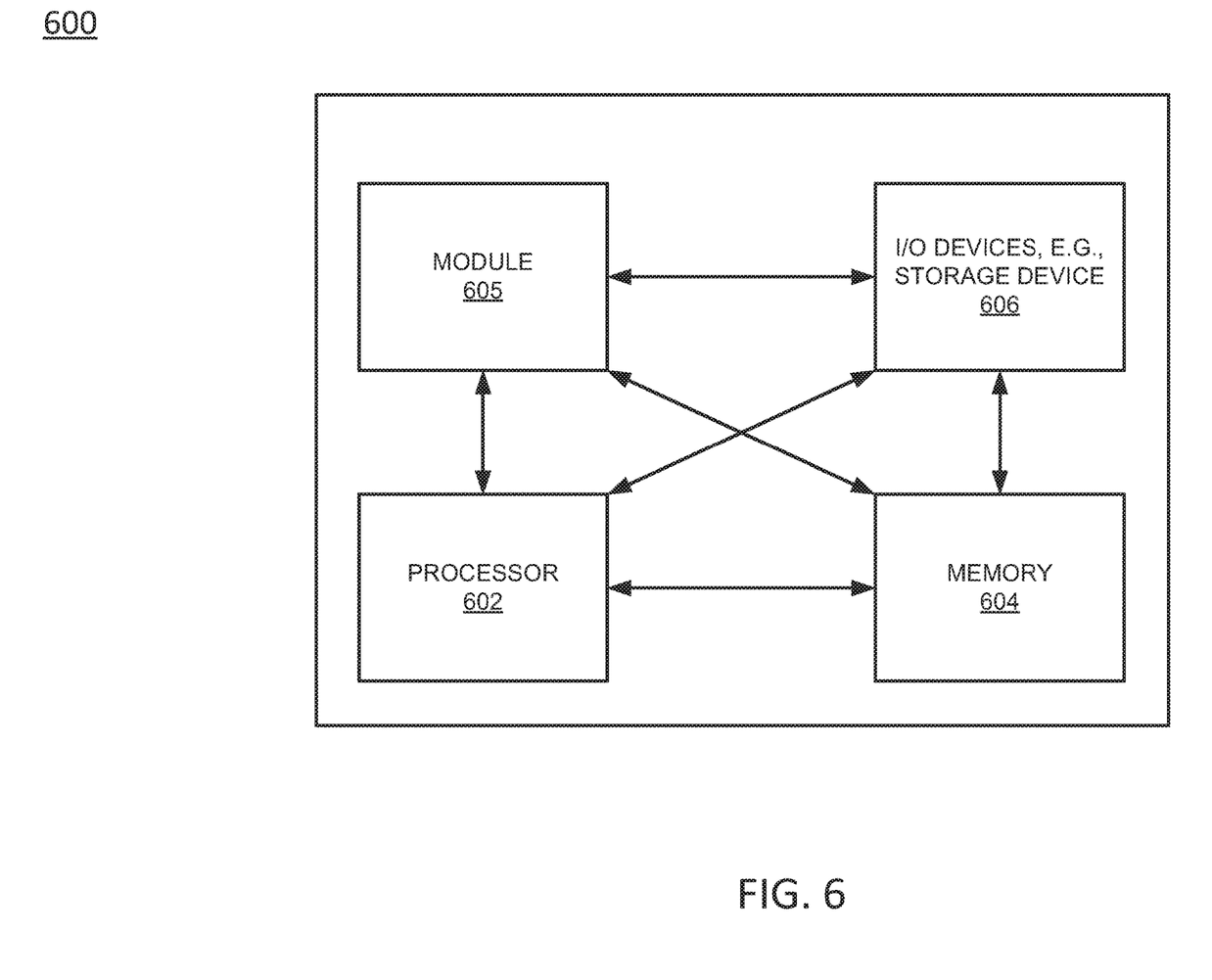
FIG. 6 is a high level block diagram of the calibration method that is implemented using a general purpose computing device that is programmed to operate as a special purpose computing device.

The AS 108 may comprise a general purpose computer programmed to operate as a special purpose computer, as illustrated in FIG. 6 and discussed below. In one example, the AS 108 may perform the methods discussed below related to re-calibrating color measurement instruments based on user-made color selections. For instance, in one example, the AS 108 hosts an application that receives requests (e.g., from manufacturers and/or end users of color measurement instruments) to calculate calibration adjustments for particular color measurement instruments. In other examples, all or part of the application may be executed on the UEs 104 and/or MEs 106, and the AS 108 may assist with certain operations of the application.

In one example, the DB 110 stores color data transmitted by the UEs 104. The color data may comprise color measurements (e.g., direct measurements of the colors of various color samples, made by various color measurement instruments) as well as user-made color selections (e.g., user interpretations or selections of colors corresponding to the color measurements). In one example, each color data entry that is stored in the DB 110 may include one or more of the following items of information: the type (e.g., make and model) of the color measurement instrument from which the color data was transmitted, the value of the color measurement (e.g., the raw sensor reading and/or the RGB or XYZ tristimulus values), the user-made color selection (e.g., closest matching standard color selected by the end user), the day and/or time at which the color measurement and user-made color selection were made, and the day and/or time at which the color measurement and user-made color selection uploaded to the DB 110.

The DB 110 may also store transforms for various color measurement instruments. The transforms comprise mathematical operators (e.g., matrices, parameters for artificial neural networks, or the like) that may be used to transform color measurement instrument wavelength channel responses into color readings. In one example, each transform that is stored in the DB may include one or more of the following items of information: an initial (e.g., factory-set) version of the transform, the type (e.g., make and model) of the color measurement instrument to which the transform applies, and a time (e.g., day and/or time) of a last or most recent adjustment to the transform, if applicable.

In a further example, the DB 110 may store calibration adjustments for transforms used by the color measurement instruments. In this case, each calibration adjustment that is stored in the DB 110 may include one or more of the following items of information: the type (e.g., make and model) of the color measurement instrument to which the calibration adjustment applies and the amount of the calibration adjustment.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional endpoint devices, sensors, access networks, network elements, application servers, etc. without altering the scope of the present disclosure.

Figure 2:
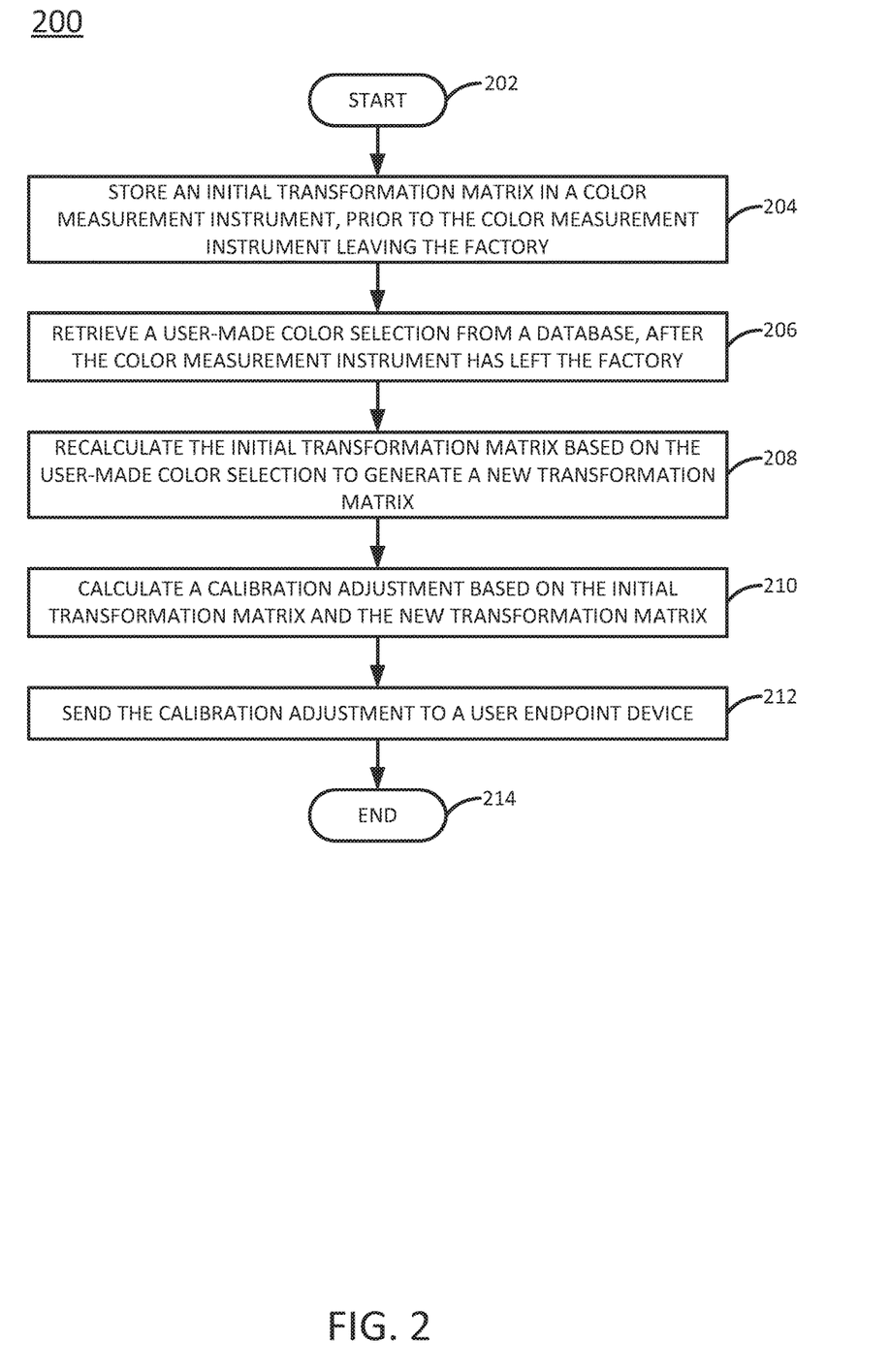
FIG. 2 is a flow chart illustrating one example of a method for re-calibrating a color measurement instrument.

FIG. 2 is a flow chart illustrating one example of a method 200 for re-calibrating a color measurement instrument. The method 200 may be performed wholly or partially under the supervision of the manufacturer of the color measurement instrument, or by another party who can access a database of user-made color selections and provide calibration adjustments based on those user-made color selections to the end users. In other words, the method 200 illustrates one way in which a remote device may calculate a calibration adjustment for use by a color measurement instrument. As such, the method 200 may be performed by one of the MEs 106 of FIG. 1. However, in other examples, the method 200 may be performed, in whole or in part, by another device (e.g., AS 108 of FIG. 1, or the apparatus 600 illustrated in FIG. 6). As such, any references made to components of the network 100 illustrated in FIG. 1 are not intended to limit the means by which the method 200 may be performed.

The method 200 beings in step 202. In step 204, an initial transformation matrix M may be stored in a color measurement instrument, e.g., prior to the color measurement instrument leaving a factory. In one example, the color measurement instrument uses n wavelength channels (where, in one example, n=6) to measure the reflected signal from a color sample. The color measurement instrument then uses the initial transformation matrix M to convert the raw channel responses (e.g., sensor readings) of the n channels into a color reading.

In particular, the initial transformation matrix M may be used to transform a sensor reading S (i.e., a row vector), obtained by the color measurement instrument measuring a sample, into a row vector color reading R (potentially having a different dimension than the sensor reading S) according to:

$$R=S*M \quad (\text{EQN. 1})$$

where R may be expressed in terms of reflectances, XYZ tristimulus values (which, in turn, can be transformed into L*a*b* coordinates), or any other units of measure that convey color. In one example, both the sensor reading S and the row vector color reading R comprise matrices.

In the factory, the initial transformation matrix M may be derived using a set of calibration standards with known row vector color readings $R_{standard}$ and measured, unit-specific sensor reading values $S_{standard}$ according to:

$$M=\text{pinv}(S_{standard})*R_{standard} \quad (\text{EQN. 2})$$

where each row of $S_{standard}$ and $R_{standard}$ represents a different calibration standard (i.e., a sample having a known color, which is used to calibrate a color measurement instrument), and each column of $S_{standard}$ and $R_{standard}$ represents a sensor dimension for a sensor reading S, or an output color dimension for a color reading R, respectively. pinv denotes the Moore-Penrose pseudoinverse. EQN. 2 may be used to derive the initial transformation matrix M, as noted above. However, it should be noted that since the selection of calibration standards may be limited by the availability of color samples and other resources, the resultant transformation matrix M may contain errors.

In step 206, a user-made color selection, made based on a color measurement made by the color measurement instrument, may be retrieved from a database, e.g., after the color measurement instrument has left the factory. The user-made color selection may represent a selection of color by an end user of the color measurement instrument, which is based on a color reading R that is output by the color measurement instrument in response to measurement of a specific color sample. The user-made color selection may be retrieved by a manufacturer endpoint device (e.g., one of the MEs 106 illustrated in FIG. 1) or by a remote application server residing in a network (e.g., AS 108 of FIG. 1).

When the end user measures a color sample using the color measurement instrument, the color measurement instrument will output a color measurement (e.g., R) based on a transformation made using the initial transformation matrix M that was stored in step 204. However, the final color selection made by the end user (the "user-made color selection") may not be the same as the color measurement calculated by the color measurement instrument (e.g., the end user may believe that another color is a better match to the color sample). As discussed above, both the color measurement calculated by the color measurement instrument and the final, user-made color selection may be stored in the database.

In one example, raw sensor readings made by a plurality of end users operating a plurality of color measurement instruments (which may be the same in terms of make and model to the color measurement instrument being calibrated by the method 200) may be stored in a first user matrix $S_{user}$. Thus, the first user matrix $S_{user}$ stores the direct measurements of color made by the color measurement instruments (i.e., color measurements) under the operation of the end users. User-made color selections corresponding to the raw sensor readings in the first user matrix $S_{user}$ may be stored in a second user matrix $R_{user}$. Thus, the second user matrix $R_{user}$ stores ground-truth information (which may be reflectance data, but is a more general concept).

Both $S_{user}$ and $R_{user}$ are obtained from the end users of the color measurement instruments. While the first user matrix $S_{user}$ is relatively straightforward to obtain, there are several ways in which the second user matrix $R_{user}$ may be obtained.

For instance, if the end user takes a search-type measurement, the color measurement instrument will make a color measurement of the sample, which will generate a value for the first user matrix $S_{user}$. The color measurement instrument will then search for and recommend the m closest matching colors based on the generated value (where m is at least one). The search may be performed in a local database (i.e., stored on the color measurement instrument) or a remote database (i.e., stored somewhere other than on the color measurement instrument). The end user will then select and confirm a color for the sample (which may or may not be one of the m colors recommended by the color measurement instrument). The end user's selection of the color thus constitutes feedback, from which a value for the second user matrix $R_{user}$ can be obtained. The values for the first user matrix $S_{user}$ and the second user matrix $R_{user}$ may be stored in a database (which may be different from the database used to search for the closest matching colors).

In another example, the end user may use the color measurement instrument to measure a known standard. In this case, the user-made color selection may come from another source that is trusted by the end user, such as another color measurement instrument. In this case, the color measurement instrument will make a color measurement of the known standard, which will generate a value for the first user matrix $S_{user}$. Data from the trusted source may be used to generate a value for the second user matrix $R_{user}$. Collectively the values for the first user matrix $S_{user}$ and the second user matrix $R_{user}$ may comprise end user feedback that can help to improve the calibration of the color measurement instrument.

In step 208, the initial transformation matrix M may be recalculated based on the user-made color selection to generate a new transformation matrix. In one example, the transformation matrix may be recalculated according to:

$$M_{new} = pinv\left(W * \begin{bmatrix} S_{standard} \\ S_{user} \end{bmatrix}\right) * W * \begin{bmatrix} R_{standard} \\ R_{user} \end{bmatrix} \quad \text{(EQN. 3)}$$

where $M_{new}$ is the new transformation matrix, and W represents a matrix containing weights that are applied to the calibration standard and user data. The weights may be determined by the manufacturer of the color measurement instrument. The initial transformation matrix M may be recalculated by a manufacturer endpoint device (e.g., one of the MEs 106 illustrated in FIG. 1) or by a remote application server residing in a network (e.g., AS 108 of FIG. 1).

In step 210, a calibration adjustment ΔM may be calculated based on the initial transformation matrix M and the new transformation matrix $M_{new}$. In one example, the calibration adjustment ΔM may be calculated as:

$$\Delta M = M_{new} - M \quad \text{(EQN. 4)}$$

In step 212, the calibration adjustment ΔM may be sent to a user endpoint device. In one example, the user endpoint device is a color measurement instrument that is configured for wired and/or wireless communication. In another example, the user endpoint device is another endpoint device, such as a laptop computer, a desktop computer, or a mobile device, which is configured for wired and/or wireless communication and that is also communicatively coupled to a color measurement instrument. In one example, the calibration adjustment ΔM is sent in the form of a firmware update, where download of the firmware update allows the user endpoint device to make use of the calibration adjustment ΔM when making future color measurements with the color measurement instrument. The calibration adjustment ΔM may be sent by a manufacturer endpoint device (e.g., one of the MEs 106 illustrated in FIG. 1) or by a remote application server residing in a network (e.g., AS 108 of FIG. 1).

In step 214, the method 200 may end.

It should be noted that the method 200 may loop through one or more steps. For instance, rather than ending after step 212, the method 200 may return to step 206 after a period of time and repeat steps 206-212 (e.g., using more up-to-date user-made color selections to calculate a more up-to-date calibration adjustment ΔM). Thus, the method 200 may operate continuously to update the calibration adjustment ΔM. The calibration adjustment ΔM may be updated in this manner on a period basis (e.g., every x days), randomly, on-demand (e.g., in response to an end user request), or according to any other schedule.

Moreover, in another example, rather than sending the calibration adjustment ΔM in step 212, the new transformation matrix $M_{new}$ may be sent instead. Updated new transformation matrices may continue to be calculated and sent on a period basis (e.g., every x days), randomly, on-demand (e.g., in response to an end user request), or according to any other schedule.

Adjustment of the transformation matrix in the manner described by the method 200 may improve the accuracy of color measurements made using the color measurement instrument. Since the new transformation matrix $M_{new}$ is derived from a larger sample set than the factory calibration standards, it may allow the color measurement instrument to measure color with higher accuracy. In addition, the end user of a color measurement instrument need not necessarily provide his own feedback (e.g., in the form of a color measurement and corresponding user-made color selection) to obtain a calibration adjustment for the color measurement instrument; the calibration adjustment could be made based entirely on feedback provided by other end users.

Figure 3:
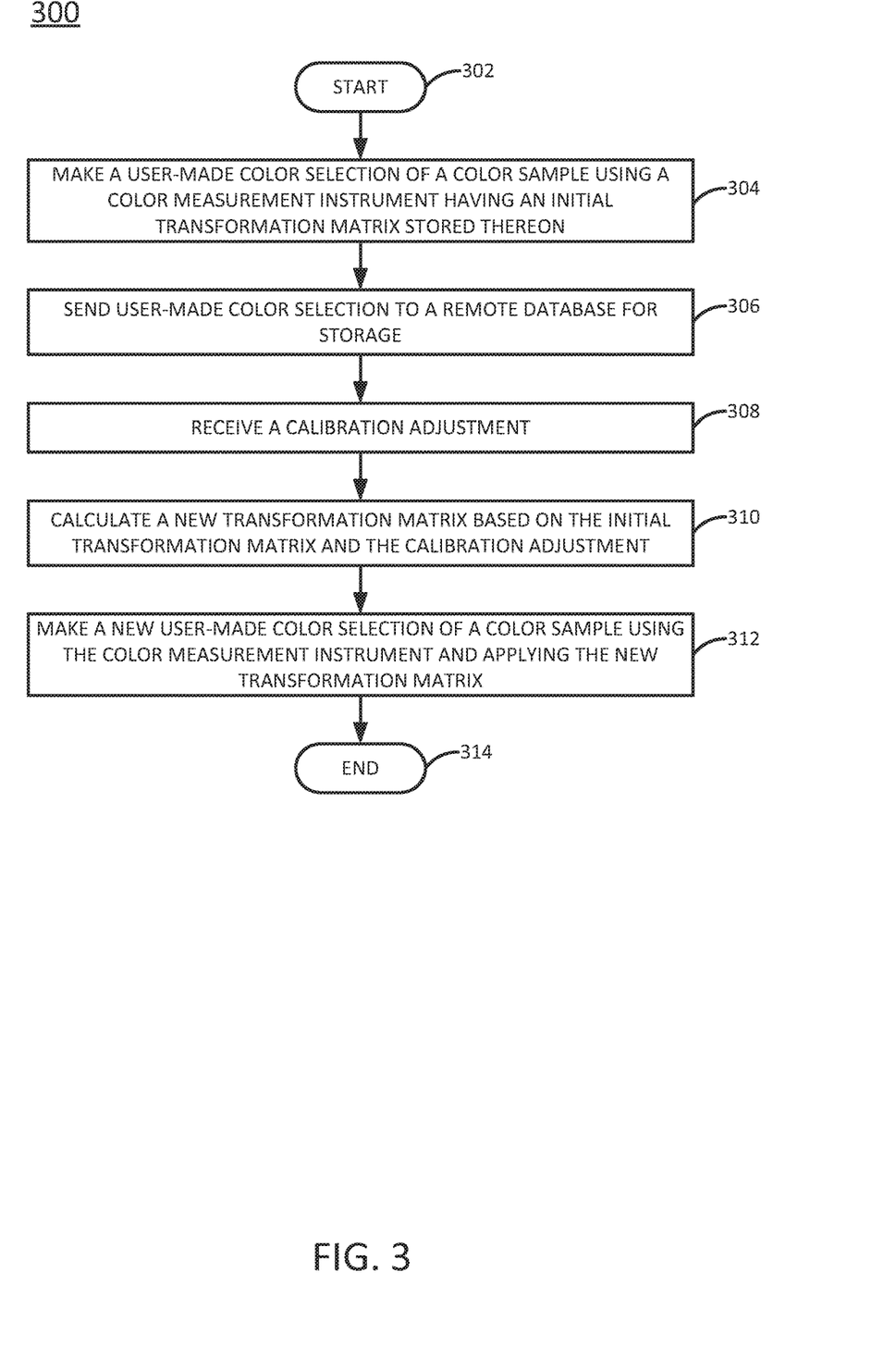
FIG. 3 is a flow chart illustrating one example of a method for re-calibrating a color measurement instrument.

FIG. 3 is a flow chart illustrating one example of a method 300 for re-calibrating a color measurement instrument. The method 300 may be performed under the supervision of an end user of the color measurement instrument, or by another party who can receive remotely calculated calibration adjustments and implement those calibration adjustments in an appropriate color measurement instrument. In other words, the method 300 illustrates one way in which a color measurement instrument may make use of a calibration adjustment calculated by a remote device. As such, the method 300 may be performed by one of the UEs 104 of FIG. 1. However, in other examples, the method 300 may be performed, in whole or in part, by another device (e.g., AS 108 of FIG. 1, or the apparatus 600 illustrated in FIG. 6). As such, any references made to components of the network 100 illustrated in FIG. 1 are not intended to limit the means by which the method 300 may be performed.

The method 300 beings in step 302. In step 304, a user-made color selection of a color sample may be made, based on a color measurement made using a color measurement instrument. In one example, the color measurement instrument comprises n wavelength channels (where, in one example, n=6) that measure the reflect signal from the color sample. As such, the user-made color selection may represent a selection of a color by an end user of the color measurement instrument, which is based on a color reading R that is output by the color measurement instrument in response to measurement of the color sample. In one example, the color measurement instrument transforms the raw channel responses (e.g., sensor readings) of the n channels into a color reading R using an initial transformation matrix M that was stored in the color measurement instrument at the time of manufacture (e.g., prior to the color measurement instrument leaving the factory).

In step 306, the user-made color selection may be sent to a remote database for storage. As the user-made color selection may not be the same as the color measurement calculated by the color measurement instrument (e.g., the end user may believe that another color is a better match to the color sample), both the color measurement calculated by the color measurement instrument and the user-made color selection may be sent to the database in this step.

In step 308, a calibration adjustment may be received, e.g., from a manufacturer endpoint device operated by a manufacturer of the color measurement instrument or from an application server that is communicatively coupled to the database. In one example, the calibration adjustment ΔM is received in the form of a firmware update that is downloaded to the color measurement instrument.

In step 310, a new transformation matrix $M_{new}$ may be calculated, based on the initial transformation matrix M and the calibration adjustment ΔM. In one example, the new transformation matrix $M_{new}$ may be calculated as:

$$M_{new} = M + \Delta M \quad \text{(EQN. 5)}$$

In step 312, a new color measurement may be made using the color measurement instrument and applying the new transformation matrix $M_{new}$ to the channel responses of the color measurement instrument. The new color measurement may measure the color of the same color sample measured in step 204, or the new color measurement may measure the color of a different color sample. The new color measurement may be stored, e.g., in a remote database and along with a corresponding user-made color selection, so that the new color measurement is available for use in calculating further adjustments to the transformation matrix (e.g., as discussed in connection with FIG. 2).

The method 300 may end in step 314.

It should be noted that the method 300 may loop through one or more steps. For instance, rather than ending after step 312, the method 300 may return to step 304 after a period of time and repeat steps 304-312 (e.g., using the new transformation matrix $M_{new}$ to make new color measurements).

Furthermore, it should be noted that the end user may elect not to apply the calibration adjustment $\Delta M$. In this case, the end user may re-set the color measurement instrument so that the initial transformation matrix M continues to be used. In one example, this can be done by declining to download the calibration adjustment $\Delta M$. In another example, this can be done by setting the calibration adjustment $\Delta M$ to zero. In another example, the end user may simply request that the color measurement instrument recover the initial transformation matrix M.

In a further example of the present disclosure, the color measurement instrument may be trained, e.g., prior to leaving the factory, using an artificial neural network (ANN). In this case, the raw data from the color measurement instrument's wavelength channels can be used as inputs to the ANN, which can be trained to output color readings in a desired format (e.g., CIE L*a*b* values or other values).

Figure 4:
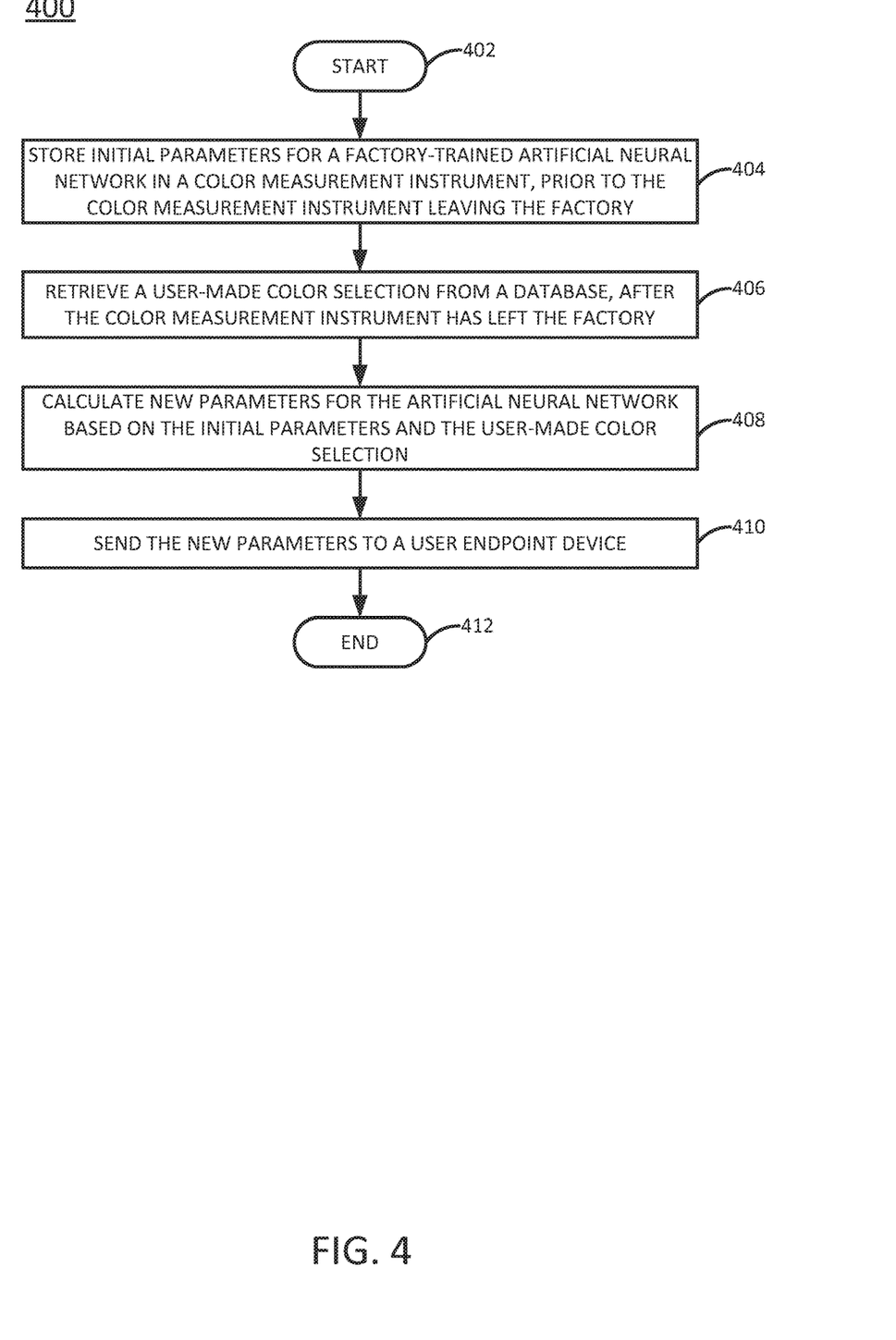
FIG. 4 is a flow chart illustrating one example of a method for re-calibrating a color measurement instrument.

FIG. 4 is a flow chart illustrating one example of a method 400 for re-calibrating a color measurement instrument. Unlike the method 200 which employs a transformation matrix, the method 400 employs an ANN which is trained to output color readings in response to raw data from the color measurement instrument's wavelength channels. The method 400 may be performed wholly or partially under the supervision of the manufacturer of the color measurement instrument, or by another party who can access a database of user-made color selections and provide calibration adjustments based on those user-made color selections to the end users. In other words, the method 400 illustrates one way in which a remote device may calculate a calibration adjustment for use by a color measurement instrument. As such, the method 400 may be performed by one of the MEs 106 of FIG. 1. However, in other examples, the method 400 may be performed, in whole or in part, by another device (e.g., AS 108 of FIG. 1, or the apparatus 600 illustrated in FIG. 6). As such, any references made to components of the network 100 illustrated in FIG. 1 are not intended to limit the means by which the method 400 may be performed.

The method 400 begins in step 402. In step 404, initial parameters $net_0$ of a factory-trained ANN may be stored in a color measurement instrument, e.g., prior to the color measurement instrument leaving a factory. In one example, the color measurement instrument uses n wavelength channels (where, in one example, n=6) to measure the reflected signal from a color sample. The number of wavelength channels may be a function of the number of illumination sources and color sensors included in the color measurement instrument. For instance, a color measurement instrument having two illumination sources and three color sensors (e.g., R, G, and B) can provide six wavelength channels for a color sample.

The color measurement instrument uses the initial parameters $net_0$ of the ANN to convert the raw channel responses (e.g., sensor readings) of the n channels into a color reading. In one example, the ANN may be created and trained using an algorithm from the MATLAB computing environment's Neural Network Toolbox. For instance, the ANN may be created and trained in a manner similar to the feedforward neural network described at https://www.mathworks.come/help/thingspeak/create-and-train-a-feedforward-neural-network.html. In particular, the ANN may be trained in-factory using a known set of calibration standards having known row vector color readings $R_{standard}$ and measured, unit-specific sensor reading values $S_{standard}$ as defined above.

In one example, the ANN has a number of inputs equal to the number of wavelength channels of the color measurement instrument and a number of outputs equal to the number of color sensors of the color measurement instrument. Thus, the inputs to the ANN in this case may be the channel responses (e.g., sensor readings S) of the color measurement instrument's wavelength channels, while the outputs of the ANN may be the corresponding row vector color readings R. The ANN may be trained in a manner similar to the calibration of the initial transformation matrix (described above with respect to EQN. 2). Thus, the ANN may function in a manner similar to the initial transformation matrix (e.g., as described above with respect to EQN. 1).

In step 406, a user-made color selection, made based on a color measurement made by the color measurement instrument, may be retrieved from a database, e.g., after the color measurement instrument has left the factory. The user-made color selection may represent a selection of color by an end user of the color measurement instrument, which is based on a color reading R that is output by the color measurement instrument in response to measurement of a specific color sample. The user-made color selection may be retrieved by a manufacturer endpoint device (e.g., one of the MEs 106 illustrated in FIG. 1) or by a remote application server residing in a network (e.g., AS 108 of FIG. 1).

When the end user measures a color sample using the color measurement instrument, the color measurement instrument will output a color measurement (e.g., R) based on a transformation made using the initial parameters $net_0$ of the ANN that were stored in step 404. However, as above, the final color selection made by the end user (the "user-made color selection") may not be the same as the color measurement calculated by the color measurement instrument (e.g., the end user may believe that another color is a better match to the color sample). As discussed above, both the color measurement calculated by the color measurement instrument and the user-made color selection may be stored in the database.

In step 408, parameters for the ANN may be recalculated based on the user-made color selection to generate new parameters $net_{new}$. The new parameters $net_{new}$ may be calculated by further training of the ANN using the user-made color selection. The further training may be performed in the same manner as the factory training (e.g., as discussed in connection with step 404).

In step 410, the new parameters $net_{new}$ for the ANN may be sent to a user endpoint device. In one example, the user endpoint device is the color measurement instrument, which has been configured for wired and/or wireless communication. In another example, the user endpoint device is another endpoint device, such as a laptop computer, a desktop computer, or a mobile device, which is configured for wired and/or wireless communication and which is also communicatively coupled to the color measurement instrument. In one example, the new parameters $net_{new}$ for the ANN are sent in the form of a firmware update, where download of the firmware update allows the user endpoint device to make use of the new parameters $net_{new}$ when making future color measurements with the color measurement instrument.

In step 412, the method 412 may end.

It should be noted that the method 400 may loop through one or more steps. For instance, rather than ending after step 410, the method 400 may return to step 406 after a period of time and repeat steps 406-410 (e.g., using more up-to-date user-made color selections to calculate a more up-to-date new parameters $net_{new}$ for the ANN). Thus, the method 400 may operate continuously to update the parameters for the ANN. The new parameters $net_{new}$ for the ANN may be updated in this manner on a period basis (e.g., every x days), randomly, on-demand (e.g., in response to an end user request), or according to any other schedule.

Figure 5:
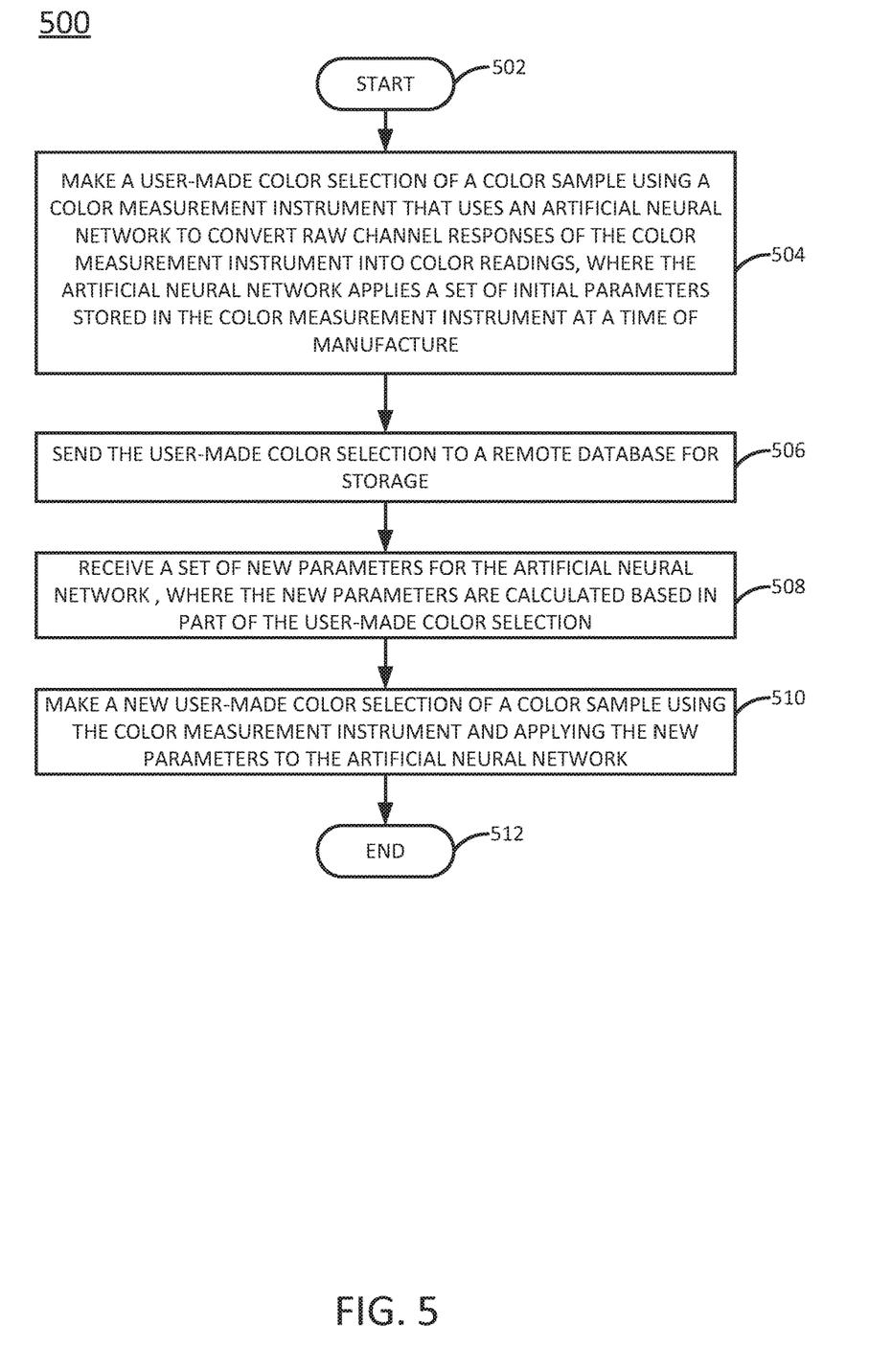
FIG. 5 is a flow chart illustrating one example of a method for re-calibrating a color measurement instrument.

FIG. 5 is a flow chart illustrating one example of a method 500 for re-calibrating a color measurement instrument. The method 500 may be performed under the supervision of an end user of the color measurement instrument, or by another party who can receive remotely calculated calibration adjustments and implement those calibration adjustments in an appropriate color measurement instrument. In other words, the method 500 illustrates one way in which a color measurement instrument may make use of a calibration adjustment calculated by a remote device. As such, the method 500 may be performed by one of the UEs 104 of FIG. 1. However, in other examples, the method 500 may be performed, in whole or in part, by another device (e.g., AS 108 of FIG. 1, or the apparatus 600 illustrated in FIG. 6). As such, any references made to components of the network 100 illustrated in FIG. 1 are not intended to limit the means by which the method 500 may be performed.

The method 500 beings in step 502. In step 504, a user-made color selection of a color sample may be made, based on a color measurement made using a color measurement instrument. In one example, the color measurement instrument comprises n wavelength channels (where, in one example, n=6) that measure the reflect signal from the color sample. As such, the user-made color selection may represent a selection of a color by an end user of the color measurement instrument, which is based on a color reading R that is output by the color measurement instrument in response to measurement of the color sample. In one example, the color measurement instrument transforms the raw channel responses (e.g., sensor readings) of the n channels into a color reading R using an ANN, where initial parameters $net_0$ for the ANN were stored in the color measurement instrument at the time of manufacture (e.g., prior to the color measurement instrument leaving the factory).

In step 506, the user-made color selection may be sent to a remote database for storage. As the user-made color selection may not be the same as the color measurement calculated by the color measurement instrument (e.g., the end user may believe that another color is a better match to the color sample), both the color measurement calculated by the color measurement instrument and the user-made color selection may be sent to the database in this step.

In step 508, a set of new parameters $net_{new}$ for the ANN may be received, e.g., from a manufacturer endpoint device operated by a manufacturer of the color measurement instrument or from an application server that is communicatively coupled to the database. In one example, the new parameters $net_{new}$ are received in the form of a firmware update that is downloaded to the color measurement instrument.

In step 510, a new color measurement may be made using the color measurement instrument and applying the new parameters $net_{new}$ to the ANN to convert the channel responses of the color measurement instrument. The new color measurement may measure the color of the same color sample measured in step 504, or the new color measurement may measure the color of a different color sample. The new color measurement may be stored, e.g., in a remote database and along with a corresponding user-made color selection, so that the new color measurement is available for use in calculating further adjustments to the transformation matrix (e.g., as discussed in connection with FIG. 4).

The method 500 may end in step 512.

It should be noted that the method 500 may loop through one or more steps. For instance, rather than ending after step 510, the method 500 may return to step 504 after a period of time and repeat steps 504-510 (e.g., applying the new parameters $net_{new}$ to the ANN to convert the channel responses of the color measurement instrument).

According to the method 500, the ANN stored on the color measurement instrument may be updated based on the new parameters $net_{new}$ that are provided by the manufacturer (e.g., in a manner substantially similar to the method 300, discussed above). Alternatively, the new parameters $net_{new}$ for the ANN may be calculated by the color measurement instrument, e.g., using local color measurement data specific to that color measurement instrument or using remote color measurement data if the color measurement instrument has access. In this way, the manufacturer need only train the initial parameters $net_0$ for the ANN, and the color measurement instrument may independently calculate and apply updates to the parameters.

FIG. 6 is a high level block diagram of the calibration adjustment method that is implemented using a general purpose computing device 600 that is programmed to operate as a special purpose computing device. In one example, a general purpose computing device 600 comprises a processor 602, a memory 604, a calibration adjustment module 605 and various input/output (I/O) devices 606 such as a display, a keyboard, a mouse, a modem, a network connection and the like. In one example, at least one I/O device is a storage device (e.g., a disk drive, an optical disk drive, a floppy disk drive). It should be understood that the calibration adjustment module 605 can be implemented as a physical device or subsystem that is coupled to a processor through a communication channel.

Alternatively, the calibration adjustment module 605 can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the general purpose computing device 600. Additionally, the software may run in a distributed or partitioned fashion on two or more computing devices similar to the general purpose computing device 600. Thus, in one example, the calibration adjustment module 605 for calibrating a color measurement instrument described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various examples which incorporate the teachings of the present disclosure have been shown and described in detail herein, those skilled in the art can readily devise many other varied examples that still incorporate these teachings.

What is claimed is:

1. A method, comprising:
    storing an initial transform for converting wavelength channel responses of a color measurement instrument to color readings, wherein the initial transform is set in-factory by a manufacturer of the color measurement device;
    retrieving a color selection of a sample from a database, wherein the color selection was made by an end user in response to a color reading by the color measurement instrument using the initial transform;
    calculating an adjustment to the initial transform using the color selection; and
    sending the adjustment to the color measurement instrument for use in making future color measurements.

2. The method of claim 1, wherein the initial transform comprises an initial transformation matrix.

3. The method of claim 1, wherein the calculating comprises:
    recalculating the initial transformation matrix based on the color selection to generate a new transformation matrix;
    calculating the adjustment based on the initial transformation matrix and the new transformation matrix.

4. The method of claim 3, wherein the initial transformation matrix is derived using a plurality of calibration standards having known color readings and measured wavelength channel responses.

5. The method of claim 4, wherein the recalculating applies weights to the plurality of calibration standards and to the color measurement.

6. The method of claim 5, wherein the adjustment comprises a difference between the initial transformation matrix and the new transformation matrix.

7. The method of claim 1, wherein the initial transform comprises initial parameters for an artificial neural network.

8. The method of claim 7, wherein the adjustment comprises new parameters for the artificial neural network.

9. The method of claim 7, wherein a number of inputs of the artificial neural network is equal to a number of wavelength channels of the color measurement instrument.

10. The method of claim 7, wherein a number of outputs of the artificial neural network is equal to a number of color sensors of the color measurement instrument.

11. The method of claim 1, wherein the color measurement instrument comprises six wavelength channels.

12. The method of claim 1, wherein the adjustment is sent in the form of a firmware update for the color measurement instrument.

13. The method of claim 1, wherein the retrieving, the calculating, and the sending are performed by an application server that is communicatively coupled to the color measurement instrument and to the database via a communications network.

14. The method of claim 1, wherein the retrieving, the calculating, and the sending are performed by a manufacturer endpoint device that is communicatively coupled to the color measurement instrument and to the database via a communications network.

15. The method of claim 1, wherein the color selection differs from the color reading.

16. The method of claim 1, wherein the database stores a plurality of color readings and a plurality of color selections associated with a plurality of color samples, wherein the plurality of color readings were made by a plurality of color measurement instruments, and wherein the plurality of color selections were made by a plurality of end users operating the plurality of color measurement instruments.

17. A non-transitory computer-readable medium storing instructions which, when executed by a processor, cause the processor to perform operations, the operations comprising:
    storing an initial transform for converting wavelength channel responses of a color measurement instrument to color readings, wherein the initial transform is set in-factory by a manufacturer of the color measurement device;
    retrieving a color selection of a sample from a database, wherein the color selection was made by an end user in response to a color reading by the color measurement instrument using the initial transform;
    calculating an adjustment to the initial transform using the color selection; and
    sending the adjustment to the color measurement instrument for use in making future color measurements.

18. A method, comprising:
    storing, by a color measurement instrument, an initial transform for converting wavelength channel responses of the color measurement instrument to color readings;
    downloading, by the color measurement instrument, a firmware update, wherein the firmware update comprises an adjustment to the initial transform, and wherein the adjustment is based on a first color selection made by an end user in response to a first color reading by the color measurement instrument; and
    adjusting, by the color measurement instrument, the initial transform based on the adjustment to generate a new transform.

19. The method of claim 18, further comprising:
    making, by the color measurement device, a second color reading using the new transform.

20. The method of claim 19, further comprising:
    sending, by the color measurement instrument, the first color measurement and a second color selection to a remote database, wherein the second color selection is made by the end user in response to the second color reading, and wherein the remote database also stores the first color readings and the first color selection.

* * * * *